(12) United States Patent
Pfeifer et al.

(10) Patent No.: US 8,740,607 B2
(45) Date of Patent: Jun. 3, 2014

(54) TRANSFER SYSTEM FOR A PLASTIC INJECTION DEVICE

(75) Inventors: Ulrich Pfeifer, Muenzenberg (DE); Andreas Reuschenbach, Schwalbach/Taunus (DE); Hermann Frey, Kronberg/Taunus (DE)

(73) Assignee: Braun GmbH, Kronberg (DE)

( * ) Notice: Subject to any disclaimer, the term of this patent is extended or adjusted under 35 U.S.C. 154(b) by 403 days.

(21) Appl. No.: 13/118,747

(22) Filed: May 31, 2011

(65) Prior Publication Data
US 2011/0293775 A1  Dec. 1, 2011

(30) Foreign Application Priority Data

Nov. 29, 2008  (EP) .................................... 08020795
Nov. 30, 2009  (WO) ................. PCT/IB2009/055422

(51) Int. Cl.
*B29C 45/42*  (2006.01)
*B29C 45/26*  (2006.01)

(52) U.S. Cl.
USPC ............................ 425/444; 425/556; 425/588

(58) Field of Classification Search
USPC .......................... 425/544, 556, 576, 588, 444
See application file for complete search history.

(56) References Cited

U.S. PATENT DOCUMENTS

| | | | | |
|---|---|---|---|---|
| 4,402,657 A | * | 9/1983 | Laghi | 425/183 |
| 5,320,511 A | * | 6/1994 | Woerner | 425/130 |
| 5,654,017 A | * | 8/1997 | Harmsen | 425/116 |
| 5,660,782 A | * | 8/1997 | Davis | 264/297.2 |
| 6,679,696 B1 | * | 1/2004 | McConnell et al. | 425/112 |
| 6,827,571 B2 | * | 12/2004 | Herbst | 425/556 |
| 7,144,537 B2 | * | 12/2006 | Tustin et al. | 264/255 |
| 7,824,173 B2 | * | 11/2010 | Nishida | 425/508 |
| 7,871,260 B2 | * | 1/2011 | Boucherie | 425/548 |
| 7,879,281 B2 | * | 2/2011 | Zoppas et al. | 264/334 |
| 8,113,820 B2 | * | 2/2012 | Clark | 425/576 |
| 8,182,262 B2 | * | 5/2012 | Steinebrunner et al. | 425/572 |
| 2002/0079619 A1 | * | 6/2002 | Herbst | 264/328.8 |
| 2002/0101005 A1 | * | 8/2002 | Bodmer et al. | 264/255 |
| 2003/0170339 A1 | * | 9/2003 | Ebner et al. | 425/556 |
| 2007/0184273 A1 | * | 8/2007 | MacDonald et al. | 428/411.1 |

FOREIGN PATENT DOCUMENTS

| | | |
|---|---|---|
| DE | 195 42 102 A1 | 5/1997 |
| DE | 10 2004 022 821 A1 | 12/2005 |
| EP | 0 903 213 A | 3/1999 |
| WO | WO 02/052982 A1 | 7/2002 |
| WO | WO 2007/085063 A | 8/2007 |

OTHER PUBLICATIONS

International Search Report for PCT/IB2009/055422 dated Jan. 6, 2012.

* cited by examiner

*Primary Examiner* — Yogendra Gupta
*Assistant Examiner* — Emmanuel S Luk
(74) *Attorney, Agent, or Firm* — John P. Colbert; Vladimir Vitenberg (57) ABSTRACT

A transfer system for manufacturing molded parts of plastic by means of a plastic injection device is provided. The transfer system includes, a mold which can be opened via a mold separating surface; first and second injection stations formed in the mold; and a plurality of mold bars which are compatible with first and second injection stations. The pre-molded parts are manufactured in the first injection station and initially remain on the corresponding mold bar before being brought into the second injection station for molding a second workpiece section onto the pre-molded parts.

4 Claims, 13 Drawing Sheets

TRANSFER SYSTEM FOR A PLASTIC INJECTION DEVICE

CROSS REFERENCE TO RELATED APPLICATION

This application is a continuation of International Application No. PCT/IB2009/055422, filed Nov. 30, 2009, which claims priority to EP 08020795.4, filed Nov. 29, 2008, the substance of which is incorporated herein by reference.

FIELD OF THE INVENTION

The present disclosure relates to a transfer system for a plastic injection device for the manufacture of plastic work pieces with a mold. More particularly, the present disclosure relates to a multi-component plastic injection method carried out with the inclusion of this transfer system.

BACKGROUND OF THE INVENTION

From DE 10 2004 022 821 A1 a plastic injection device is known wherein via a rail structure integrated in the mold three mold plates each forming part cavities are successively moved by a first mold section, a second mold section and a demolding section. The mold and the mechanism for relocating the mold plates integrated in said mold is costly with regard to the manufacture of the mold and the maintenance of said mold.

SUMMARY OF THE INVENTION

In one embodiment, a transfer system for manufacturing molded parts of plastic by means of a plastic injection device includes a mold which can be opened via a mold separating surface; first and second injection stations formed in the mold; and a plurality of mold bars which are compatible with first and second injection stations. The pre-molded parts are manufactured in the first injection station and initially remain on the corresponding mold bar before being brought into the second injection station for molding a second workpiece section onto the pre-molded parts.

BRIEF DESCRIPTION OF THE DRAWINGS

While the specification concludes with claims which particularly point out and distinctly claim the subject matter that is regarded as the invention, it is believed the various embodiments will be better understood from the following description taken in conjunction with the accompanying drawings, in which:

DETAILED DESCRIPTION OF THE INVENTION

The present disclosure relates to creating solutions through which it becomes possible during the manufacture of plastic components, for example, multi-component plastic components such as toothbrushes and razor blade holders, to achieve advantages compared with previous manufacturing techniques.

According to one embodiment, a transfer system for the manufacture of molded parts of plastic by means of a plastic injection device, with:

a mold which can be opened via a mold separating surface,
a first injection station formed in the mold,
a second injection station formed in the mold,
a plurality of mold bars which are compatible with both the first injection station as well as with the second injection station, each of which can be inserted in the first injection and in the second injection station respectively in the region of the mold chamber separating surfaces, wherein
within the scope of a first injection step pre-molded parts are manufactured in the first injection station which following the opening of the mold initially remain on the corresponding mold bar,
the mold bar is embodied in such a manner that said mold bar jointly with the adhering pre-molded parts can be brought into the second injection station for injecting a second workpiece section onto the pre-molded parts in the second injection station and that, the transfer system is embodied in such a manner that through this transfer system a mold bar loaded with pre-molded parts within the scope of an injection step accomplished via a first injection station can be initially brought into an intermediate region which is located outside the mold and instead of the pre-molded parts just manufactured a mold bar provided with pre-molded parts within the scope of an earlier injection step preceding the mentioned injection step is brought into the second injection station.

As a result, it becomes possible in one embodiment, to initially bring pre-molded parts, which were manufactured within the scope of the injection step accomplished via the first injection station, into the intermediate region without time loss where they are treated, for example, cooled down. During this treatment phase, or in this example, cooling phase, the pre-molded parts manufactured within the scope of an injection step, which in time precedes the most recent injection step, can be brought into the second injection station and manufactured or injection molded. Thus, the cooling phase does not occur or only for a very short time in the mold and is actively utilized to reduce the overall cycle time to manufacture toothbrushes.

This system is suitable for the manufacture of multi-component plastic consumer goods, for example, toothbrushes and razor blade holders with soft plastic sections. During the manufacture of toothbrushes, a core body can be injection molded via the first injection station onto a bristle set previously inserted in the corresponding mold bar through an equipping device. Via the second injection station, a further plastic body can be injection molded onto this intermediate product. The plastic material processed within the scope of the second plastic injection step can be, for example, dyed elastomer material. Through this elastomer material certain handle regions as well as certain mechanically loaded sections of the toothbrush, for example, joint zones, can be manufactured in order to impart said toothbrush with structural strength and bending characteristics characterized by zones of pronounced elasticity. As a result, attractive molded parts can be manufactured even under aesthetic aspects.

The transfer system according to the present disclosure, is also suitable for the manufacture of housing and function components of electromechanical small devices such as razors and epilators, mobile telephones and for the manufacture of medical equipment items, for example, breathing masks. Thus it is possible within the scope of the first injection step to injection mold a hard shell or frame structure of a breathing mask and within the scope of the following injection step to manufacture elastomer material sections such as for instance sealing lip structures and if applicable further elastomer regions.

According to one embodiment, the mold bar already brought into the second injection station and already provided with pre-molded parts is taken from the intermediate region, which serves for intermediate treatment, for example, cooling. In this intermediate region accommodating structures can be provided through which the mold bar loaded with pre-molded parts can be placed in a positioned manner and if applicable transferred through various placement positions.

The transfer system is embodied in such a manner that within the scope of bringing a mold bar loaded with pre-molded parts from the intermediate region into the second injection station a mold bar not yet loaded with pre-molded part is brought into the first injection station. In the process, the transfer system can furthermore be embodied in such a manner that through this, a pickup of a mold bar loaded with pre-molded parts in the first injection station and simultaneously also of a mold bar equipped with further structures in the second injection station takes place.

In one embodiment, within the scope of bringing the mold bar loaded with pre-molded parts in the first injection station into the intermediate region the workpieces over-molded in the second injection station are also brought out of the mold. In another embodiment, the transfer system includes a first and a second vertical transfer slide. Via the first vertical transfer slide, removal of the mold bar loaded with pre-molded parts in the first injection station as well as a removal of the pre-molded parts further over-molded in the second injection station may be accomplished. Via the second vertical transfer slide, taking up of the pre-molded parts treated, in one example, cooled in the intermediate region and adhering to the mold bar as well as taking-up of a mold bar not yet provided with pre-molded parts is performed. The loading and removal operations processed via the two vertical transfer slides can be conducted largely overlapping in time.

In one embodiment, each of the two transfer slides comprises a carrier structure, which as such enables taking up a mold bar pair. This mold bar pair can be picked up so that the positions of the mold bars are matched to the take-up positions in the mold. In the process, via the transfer slide utilized for mold bar exchange a mold bar provided with pre-molded parts and a mold bar not yet provided with pre-molded parts are picked up while the vertical distance of these two mold bars is so matched that the mold bar already provided with pre-molded parts is moved into the upper injection station and the mold bar not yet provided with pre-molded parts is moved into the lower injection mold.

In one embodiment, the transfer system may be a vertical transfer system via which the mold bars following the opening of the mold can be moved into the intermediate region in vertical direction. The vertical transfer system may be a transfer portal, which as such engages over the mold in the region of the molding space separating planes. This transfer portal can also be incorporated in popular machine systems in an advantageous manner also by way of subsequent equipment.

In one embodiment, the movable mold halves of the mold, which serve for the formation of the two injection stations, and the corresponding stationary mold halves are each combined into a mold half module. This mold half module can be manufactured as an integral part or also put together from a plurality of individual segments. In one example, the first injection station may be located in vertical direction below the second injection station.

The transfer system can be embodied so that it is connected to one of the mold half modules, for example, the mold half module that is horizontally movable to bring about the mold open position. Alternatively to this it is also possible to connect the portal according to the invention to the stationary mold half module or also to the machine bed.

The vertical transfer system ("vertical mold bar shuttle system") serves to bring the mold bars from the injection stations into the intermediate region and to bring in the mold bars not yet provided with pre-molded parts and again bring the mold bar already provided with pre-molded parts into the respective injection station. The mold in this case is embodied in such a manner that it forms two separate plastic injection regions arranged on top of each other wherein before the closing of the mold in a first lower region of the mold a mold bar without pre-molded parts and in a second upper region of the mold a mold bar with pre-molded parts is inserted which are both arranged on a carrier frame. These two mold bars are jointly swiveled horizontally into the injection position in the mold via the carrier frame. The mold is then closed.

As used herein, the expression "mold bar" describes a bar-like structure with a part cavity, for example, a contour region for a toothbrush head. The molded parts are held on the mold bar for the transport. This mold bar can be equipped with bristle inserts and/or other insert structures within the scope of preparatory method steps. With the manufacturing method as described herein, simultaneous injecting of a first component of the pre-molded part takes place in the first, lower region and over-molding of the pre-molded part with a second component in the second, upper region.

Above the injection mold is located the vertical mold shuttle (hereinafter also referred to as VMS). In one embodiment, the VMS comprises a second carrier frame, which likewise can accommodate two mold bars. The VMS furthermore includes a horizontal feed unit, which can be arranged behind the mold. In one example, the feed unit offers two accommodating positions for mold bars.

To remove the mold bars, slight horizontal swiveling-out of the carrier frame from the injection position in the mold initially takes place. Then simultaneous vertical displacement of the two carrier frames in opposite directions with the two mold bars each through a parallel guide, wherein the first carrier frame with the two mold bars is vertically displaced upwards from the mold and the second carrier frame with the other two mold bars is vertically displaced downward into the mold. In the mold region, the carrier frame is swiveled in and in the process brings the mold bars into their corresponding injection position. The mold is subsequently closed for injecting.

In the carrier frame, which was displaced upwards, is now located a mold bar with finished molded parts at the top and a mold bar with pre-molded parts at the bottom. Both mold bars are transferred to the horizontal feed unit. In one embodiment, use of a robot repositioning of the mold bar with pre-molded parts in the upper accommodating position of the feed unit and inserting an empty mold bar in the lower accommodating position of the feed unit takes place. The mold bar with finished molded parts is removed. Both additional mold bars are subsequently transferred to the carrier frame again. The transfer from the feed unit to the carrier frame takes place through short vertical and horizontal displacements of the carrier frame.

Within the scope of this sequence executed parallel to the running injection cycle, the pre-molded parts just produced cool down in the corresponding mold bar in the carrier frame above the mold, while injection in the mold resumes as described above. Following the completion of the injection step the mold is opened again and the cycle carried out anew. Compared with conventional processes, it becomes possible because of the separating-out of the cooling time of the pre-molded parts to realize process time savings in the region of 40% of the conventional cycle time.

In one embodiment, the first and the second transfer slides of the transfer system are movable simultaneously and in counter directions. In another embodiment, the mold bar loaded with the pre-molded parts is controlled such that the pre-molded parts just manufactured are moved out of the mold for cooling down and cool down essentially outside the injection station or the mold, respectively. In another embodiment, the transfer system is controlled such that the first transfer slide loaded with the pre-molded parts to be cooled down is moved outside the injection station for cooling down and that the second transfer slide is moved into the injection station in a counter direction thereto.

Some of the advantages of the present system, include, for example, shorter cycle times through substantially simultaneous vertical mold unloading and mold loading with mold bars; intermediate cooling of the first component (equals pre-molded part) outside the mold in VMS, which shortens the cooling time; and additional processing steps such as printing and/or further insertion or joining of parts possible. These further parts can be fixed to structures which are provided by the pre-molded part.

In the region of the intermediate station, the pre-molded parts as indicated can be printed or equipped with further components, such as, blades (for alternative manufacturing of razors instead of toothbrushes) or inserts. In one embodiment, it is possible in the intermediate station to equip the pre-molded parts with electronic assemblies which within the scope of the following injection step are enclosed by a plastic material in a sealing manner. Thus, it is possible to insert an electronic miniature assembly in the pre-molded parts which assembly comprises an oscillation counter and display LEDs. Within the scope of the second injection step this assembly can be covered and sealed by a transparent or translucent material. A toothbrush of this type then possesses a verification function for adequate utilization operation.

The concept of intermediate discharge of the pre-molded parts in an intermediate station outside the mold described above can also be accomplished through a device and a method wherein the mold separating plane is substantially horizontally orientated and the transfer slides are moved in horizontal direction.

In one embodiment, the first and the second transfer slides are moved simultaneously and in counter directions in order to arrive at each former position of the other transfer slide.

In another embodiment, the mold bar loaded with the pre-molded parts just manufactured are moved out of the mold for cooling down and are cooled down essentially outside the injection station or the mold, respectively.

In yet another embodiment, the first transfer slide loaded with the pre-molded parts to be cooled down is moved outside the injection station for cooling down and that the second transfer slide is moved into the injection station in a counter direction thereto.

Figure 1:
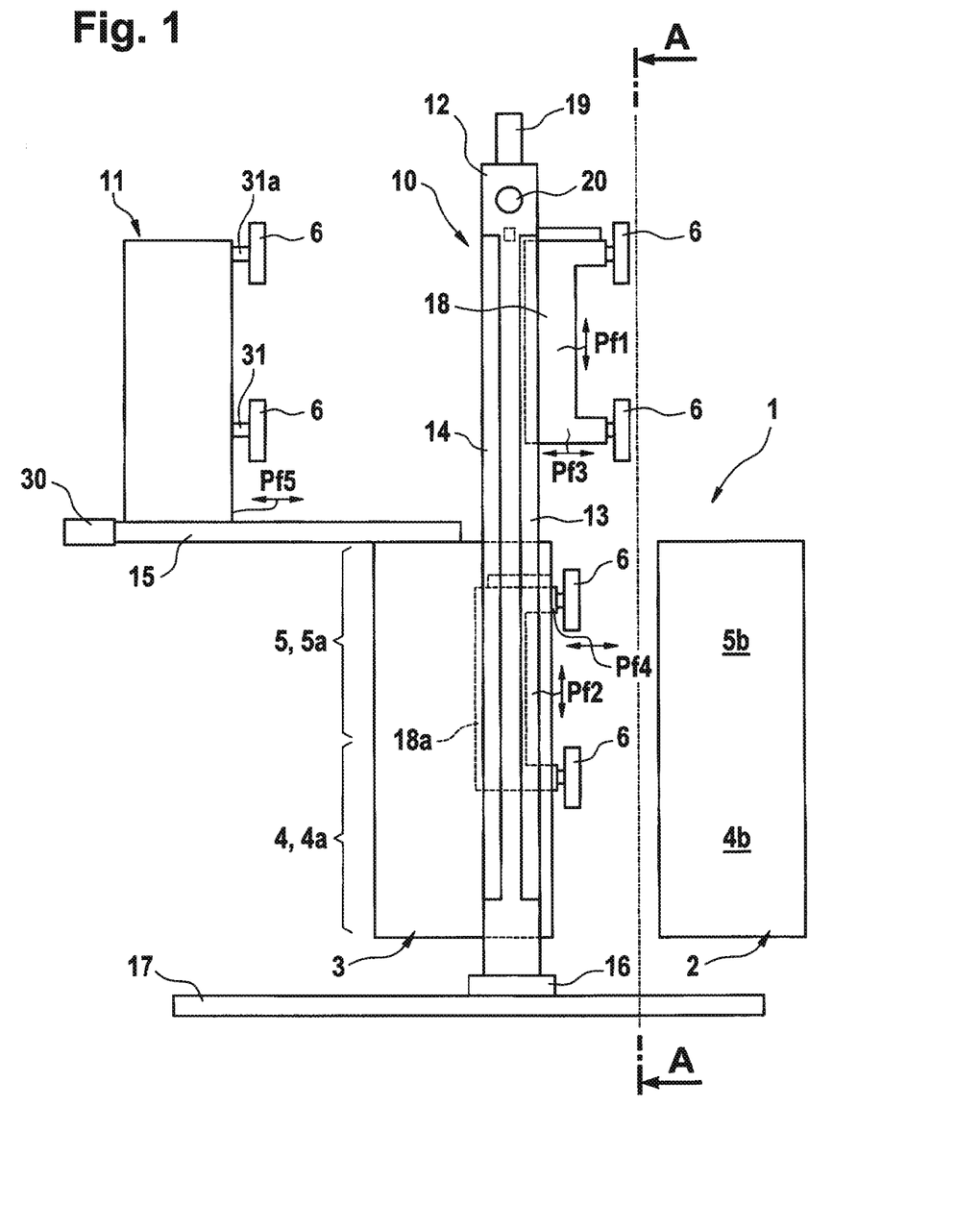
FIG. 1 A lateral view of the plastic injection device (in open position) according to the invention including the vertical transfer system with injection mold and cooling station (without pre-molded parts in the system)

Turning now to the figures, FIG. 1 shows a plastic injection device equipped with a transfer system according to the present disclosure for the manufacture of multi-component plastic workpieces—in this case toothbrushes with handle zones which are manufactured from an elastomer material. The plastic injection device comprises a first injection station 4 with a first and a second mold path 4a, 4b, which can be opened via a mold separating surface, which is substantially oriented vertically.

Furthermore, the plastic injection device also comprises a second injection station 5, which likewise comprises a first and a second mold path 5a, 5b and can likewise be opened along a mold separating surface, which is substantially oriented vertically. The injection process is performed with the inclusion of several mold bars 6 each forming part cavities, which are compatible with both the first injection station 4 as well as the second injection station 5 and each of which in the region of the mold chamber separating surfaces can be inserted in the first injection station 4 or in the second injection station located vertically above said first injection station 4.

Within the scope of a first injection step, a plurality of pre-molded parts 22 (see FIG. 2) are manufactured in the first injection station 4 which pre-molded parts following the opening of the first injection station 4 initially remain on the corresponding mold bar 6. The mold bar 6 is embodied in such a manner that it can be brought into the second injection station 5 jointly with the adhering pre-molded parts 22 for injecting a second workpiece section 29 onto the pre-molded parts 22.

The plastic injection device comprises a special transfer system 10 which is embodied and can be operated in such a manner that through said transfer system a mold bar 6 loaded with pre-molded parts 22 within the scope of an injection step accomplished via the first injection station 4 can be initially brought into an intermediate region, for example, the cooling station 11 and a mold bar 6 provided with pre-molded parts 22 within the scope of an earlier injection step preceding the mentioned injection step is brought into the second injection station 5.

The mold bar 6 brought into the second injection station 5 and provided with pre-molded parts 22 is removed from the intermediate region, for example, the cooling station. The transfer system 10 is embodied in such a manner than within the scope of bringing a mold bar 6 loaded with pre-molded parts 22 from the intermediate region 11 into the second injection station 5 a mold bar 6 not yet loaded with pre-molded parts 22 is brought into the first injection station 4.

The transfer system 10 is embodied in such a manner that through said transfer system picking-up of a mold bar 6 loaded with pre-molded parts 22 in the first injection station 4 and a mold bar 6 equipped with further structures 29 in the second injection station 5 takes place. Within the scope of bringing the mold bar 6 loaded with pre-molded parts 22 in the first injection station 4 into the intermediate region 11, the workpieces over-molded in the second injection station 5 are brought out of the second injection station 5.

The transfer system 10 is embodied as a vertical transfer system via which the mold bars 6 following the opening of the injection stations 4, 5 can be moved in vertical direction into the intermediate region, for example, the cooling station 11. The vertical transfer system in this case is embodied as transfer portal in a manner that engages over the mold 1 forming the two injection stations 4, 5 in the region of the mold chamber separating planes. The first mold halves 4a, 5a of the mold 1 as well as the second mold halves 4b, 5b of the mold 1 are each combined into a mold half module 2, 3.

The transfer system 11 is tied to the in this representation left mold half module 3. The mold half module 3 can be moved in horizontal direction to bring about the mold open position. The first injection station 4 may be located in vertical direction under the second injection station 5. The transfer system 10 comprises a first vertical transfer slide 26 and a second vertical transfer slide 26a. Each of the two transfer slides 26, 26.1 comprises a carrier structure for carrying a pair of mold bars 6. The transfer system 10 can form a mold equipping device embodied as independent unit which can be subsequently tied to existing popular plastic injection molding machines with existing injection molds 1 (as a rule standard molds). Through the transfer system, a substantially shorter manufacturing time compared with previous workpiece changing devices is achieved.

The injection mold 1 has at least two injection stations 4, 5 separated from each other in each of which a mold bar 6 is inserted in a varying process state. The vertical transfer system 10 makes possible quick, substantially simultaneous feeding and discharging of mold bars 6 in or from the injection mold 1 and thus substantially reduces the stoppage time of the injection mold 1. A further advantage of the transfer system 10 according to the present disclosure, in addition to reducing the stoppage time of the injection mold 1 is "intermediate parking" of pre-molded parts 22 for cooling down outside the injection mold 1. As a result, the cooling time is separated out of the actual injection cycle and thus the total cycle time additionally reduced. To this end, the intermediate region is designed as cooling station 11 which is also part of the transfer system 10 and incorporated in the mold bar changing mechanism.

Figure 4:
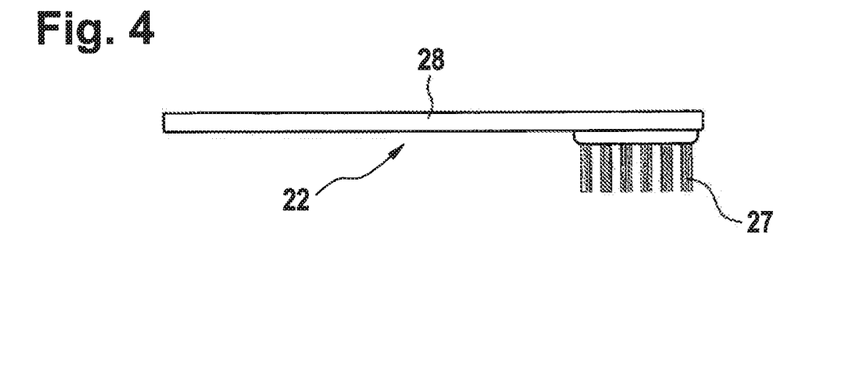
FIG. 4 A lateral view of a part body (pre-molded part) of a toothbrush.
Figure 5:
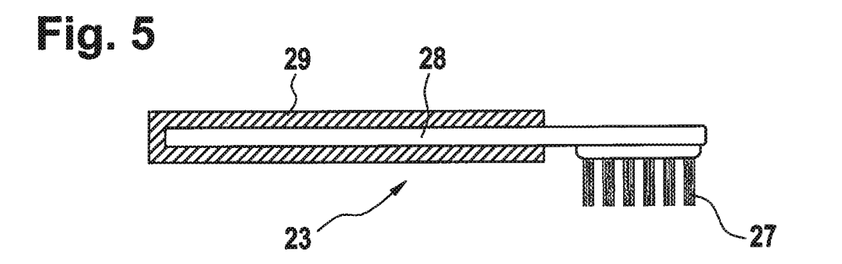
FIG. 5 A lateral view of the finished toothbrush body.
Figure 6:
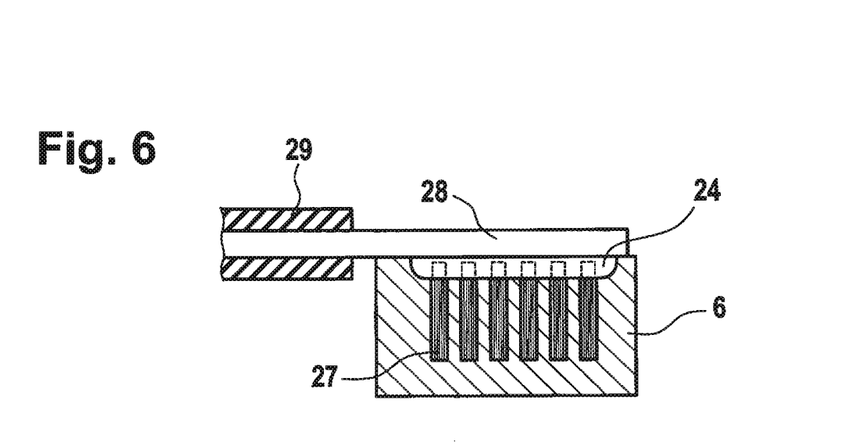
FIG. 6 A detailed view of the toothbrush body held in the mold bar.

According to one embodiment, the transfer system can be employed for the efficient manufacture of toothbrush bodies 23, which—as is evident from the FIGS. 4, 5 and 6—consist of at least two injection components 28 and 29. With these toothbrush bodies 23, bristle bundles 27 of at least one first injection component are over-molded and the bristle bundles 27 embedded in the injection component 28 according to FIG. 6. In one embodiment, the system is also suitable for manufacturing other multi-component plastic products, for example, products with additional insert structures such as bristle bundles or other function parts.

Figure 2:
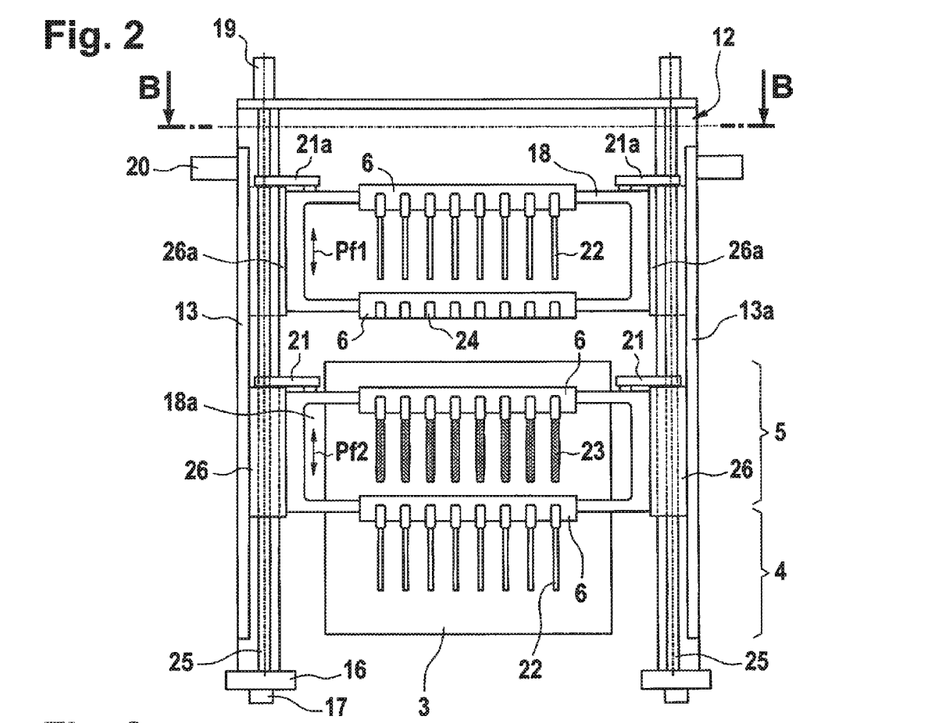
FIG. 2 A front view A-A of FIG. 1 of the vertical transfer system with view onto the moveable mold half of the injection mold,—here for the explanatory representation without cooling station.
Figure 3:
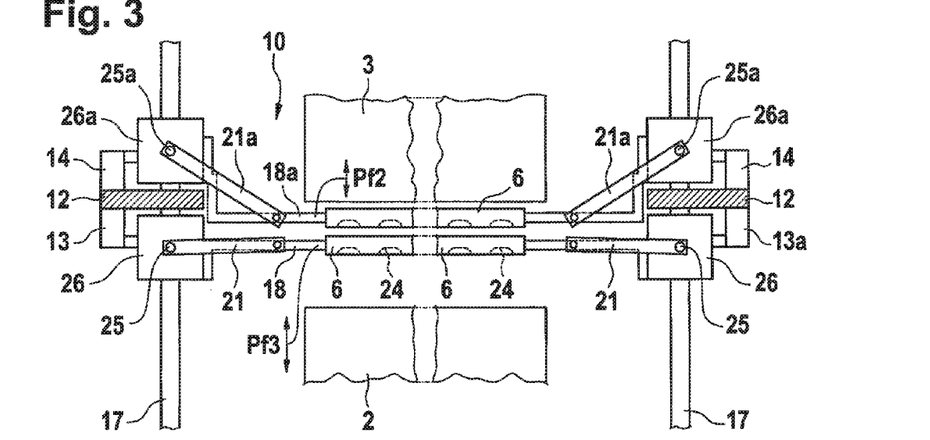
FIG. 3 A detailed view B-B of FIG. 2 as top view of a section of the vertical transfer system according to the invention with moveable mold half of the injection molding mold again without cooling station.

The substantial components of the transfer system are illustrated in the FIGS. 1 to 3. Main component of the system is the injection mold 1 with a fixed 2 and a movable mold half 3. The mold 1 has at least two injection stations 4, 5 separated from each other in each of which a mold bar 6 is inserted in a different process state. All mold bars 6 located in the production system pass through the entire production process leading to the manufacture of the toothbrush body 23, wherein the injection mold with the tied transfer system forms the core device for completing the overall process. On the mold bars 6 the molded, finished toothbrush bodies 23, part bodies 22 of said toothbrush bodies and bristle bundles 27 are held and transported onward.

Before feeding the mold bars 6 into the injection mold the mold bars 6 are equipped with bristle bundles 27, which are then over-molded with the first component 28 in a first injection operation in the first injection station 4.

In a first lower injection station 4 a first injection component 28 for forming a part body 22 is injection molded and in the process the bristle bundles 27 embedded in a contour region 24 of the part body 22. The contour region 24 with bristle bundles 27 is located on the mold bar 6. At the same time a previously molded part body 22 is over-molded with a second, preferentially softer injection component 29 in a second upper injection station 5.

The two mold bars 6 just processed in the injection mold 1, on which following the completed injection operation part bodies 22 or finished toothbrush bodies 23 are now held, are transferred vertically upwards above the mold (Path 2) from the injection mold 1 by means of the vertical transfer system 10. At the same time, the vertical transfer system 10 transfers to workpiece carriers strips 6 of another state vertically downwards (Path 2) into the injection mold 1. In other words, a simultaneous vertical movement in opposite directions of the two slides with the receptacles 18 and 18a takes place. The first lower injection station 4 in the process is supplied with a mold bar 6, which is equipped with bristle bundles 27, and the second upper injection station 5 is supplied with a mold bar 6 on which part bodies or "pre-molded parts" 22 are already held. These part bodies 22 just supplied to the injection mold 1 were able to cool down in the cooling station 11 during the preceding injection operation. The two mold bars 6 which are now located above the injection mold 1 are handed over to the cooling station 11 parallel to the now following new injection operation.

After the termination of the injection operation performed in each of the stations 4 and 5 the movable mold half 3 opens. After this, the two receptacles 18 and 18a are brought into transfer position with horizontal movement (Path 3 and Path 4) by means of the two swivel arms 21 and 21a. Here, Path 3 is longer than Path 4 so that the two receptacles 18 and 18a stand offset relative to each other.

Figure 7:
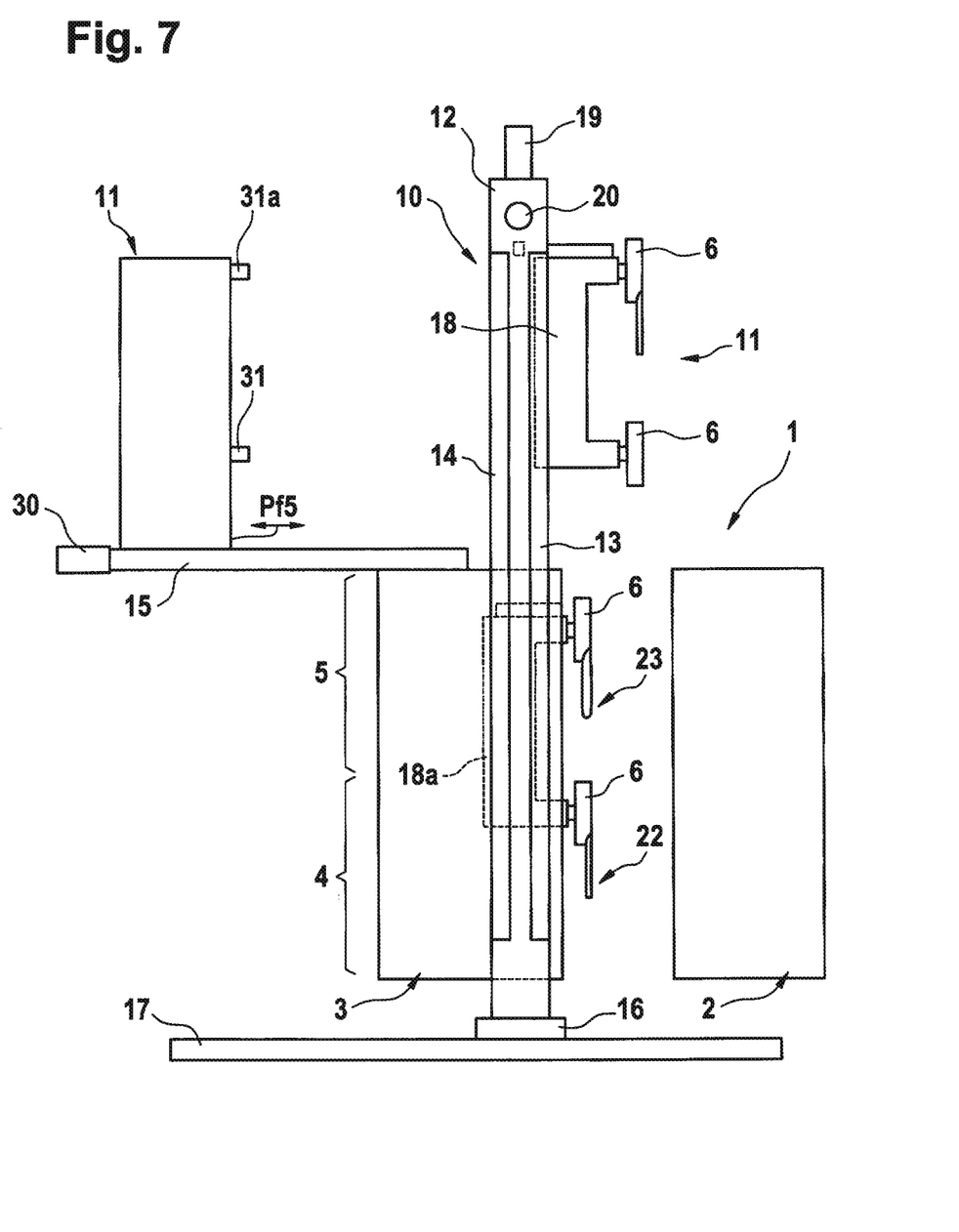
FIG. 7 A lateral view of the device according to the invention in a state with mold halves moved into an open position.

FIG. 7 shows the situation after the opening of the mold 1 and the swiveling-out of the receptacles 18, 18a. This is followed by the simultaneous vertical position change of the slides 26 and 26a with the receptacles 18 and 18a attached in opposite directions (Path 1 and Path 2).

Figure 9:
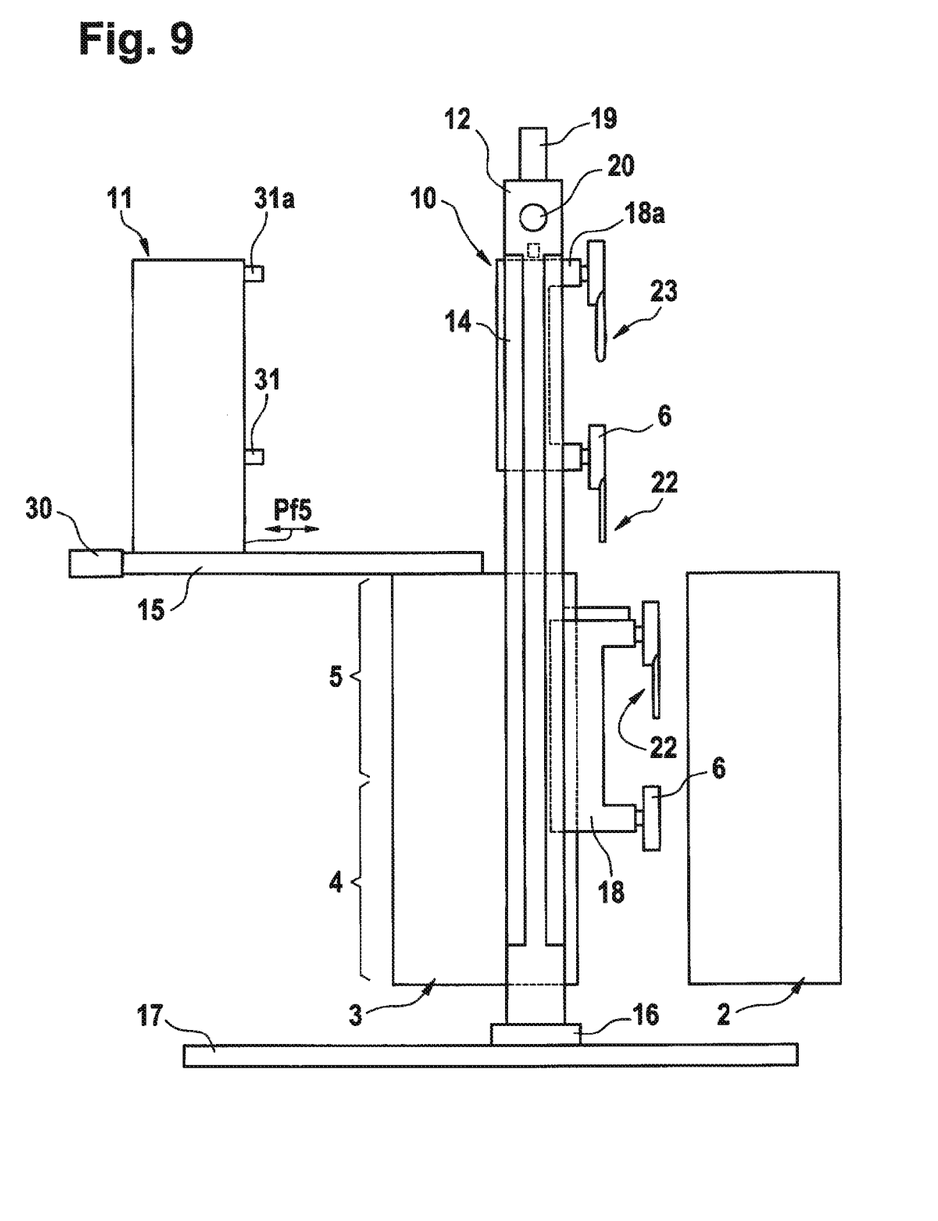
FIG. 9 A lateral view of the device according to the invention to explain a state after the vertical position change of the slides.
Figure 10:
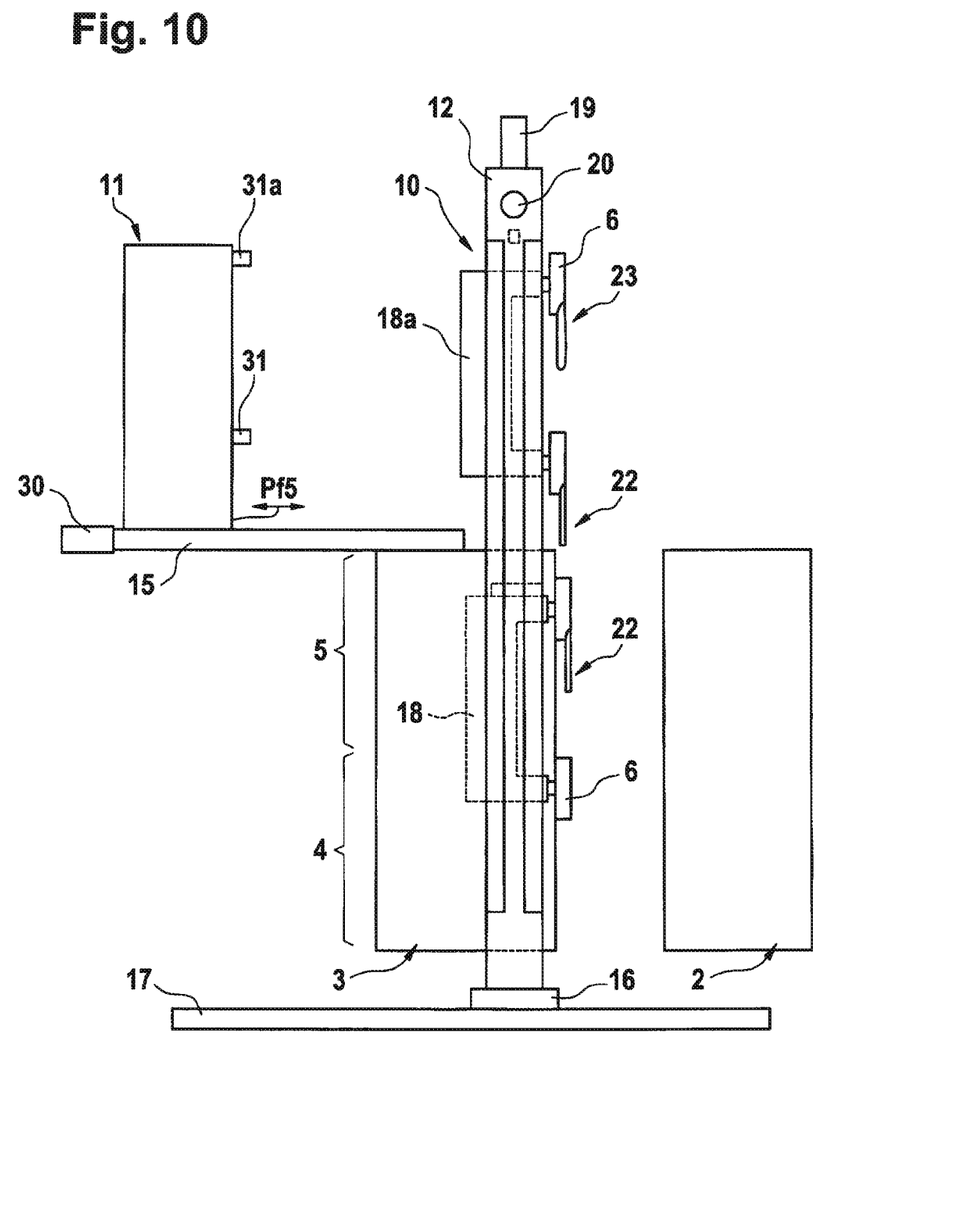
FIG. 10 A lateral view of the device according to the invention to explain the state of the receptacles in swiveled-in position (position before the closing of the mold halves)
Figure 11:
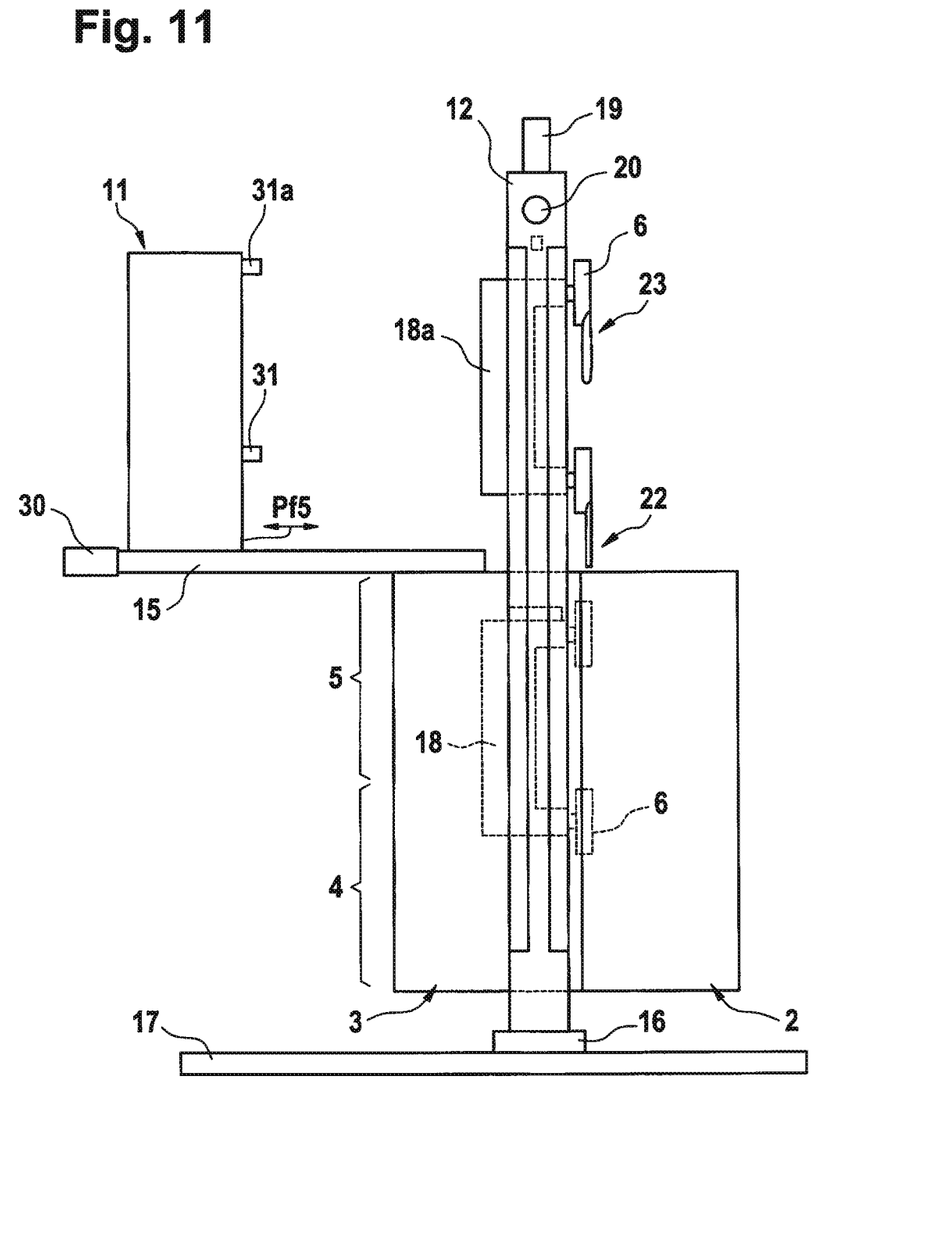
FIG. 11 A lateral view of the device according to the invention to explain a state in which the mold is closed and the next injection operation completed.
Figure 12:
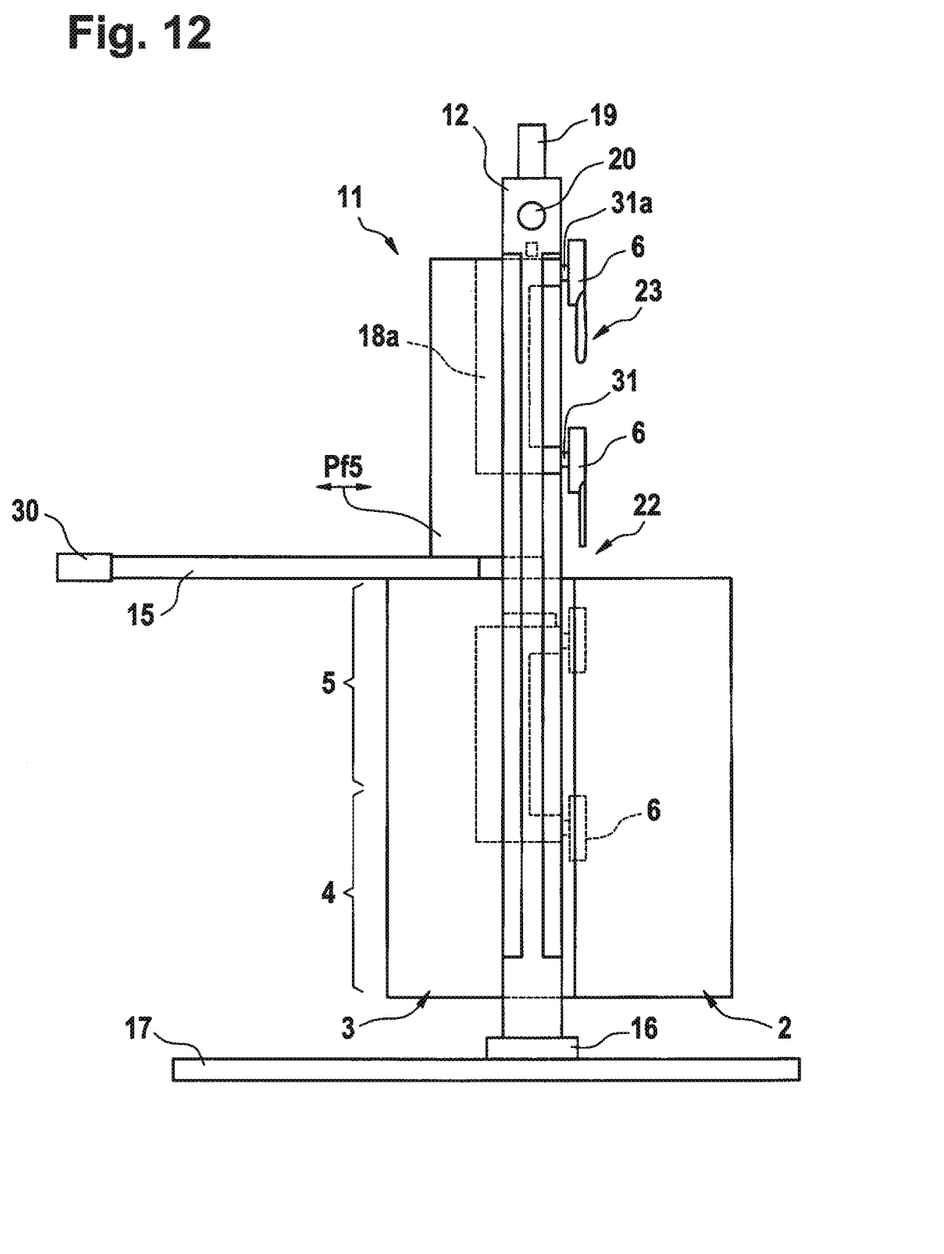
FIG. 12 A lateral view of the device according to the invention to explain a state in which the cooling station is moved forward to receive the workpiece carrier strips (mold bars)

FIG. 9 shows the situation following the completed vertical position change. After the vertical position change of the slides 26 and 26a the receptacles 18 and 18a are moved back into the mold plane (Path 3 and Path 4) via the swivel arms 21 and 21a. The receptacles 18 and 18a are then again located on a vertical plane as is shown in FIG. 10. After this, the injection mold 1 closes and the next injection operation can take place. This state is illustrated in FIG. 11. At the same time (cycle-parallel) with the injection operation that now occurs the two mold bars 6 which are now located above the injection mold, are handed over to the cooling station 11 which previously moved forward according to Path 5 (see FIG. 12). The mold bars 6 in the process are handed over to the receptacles 31 and 31a of the cooling station.

Figure 13:
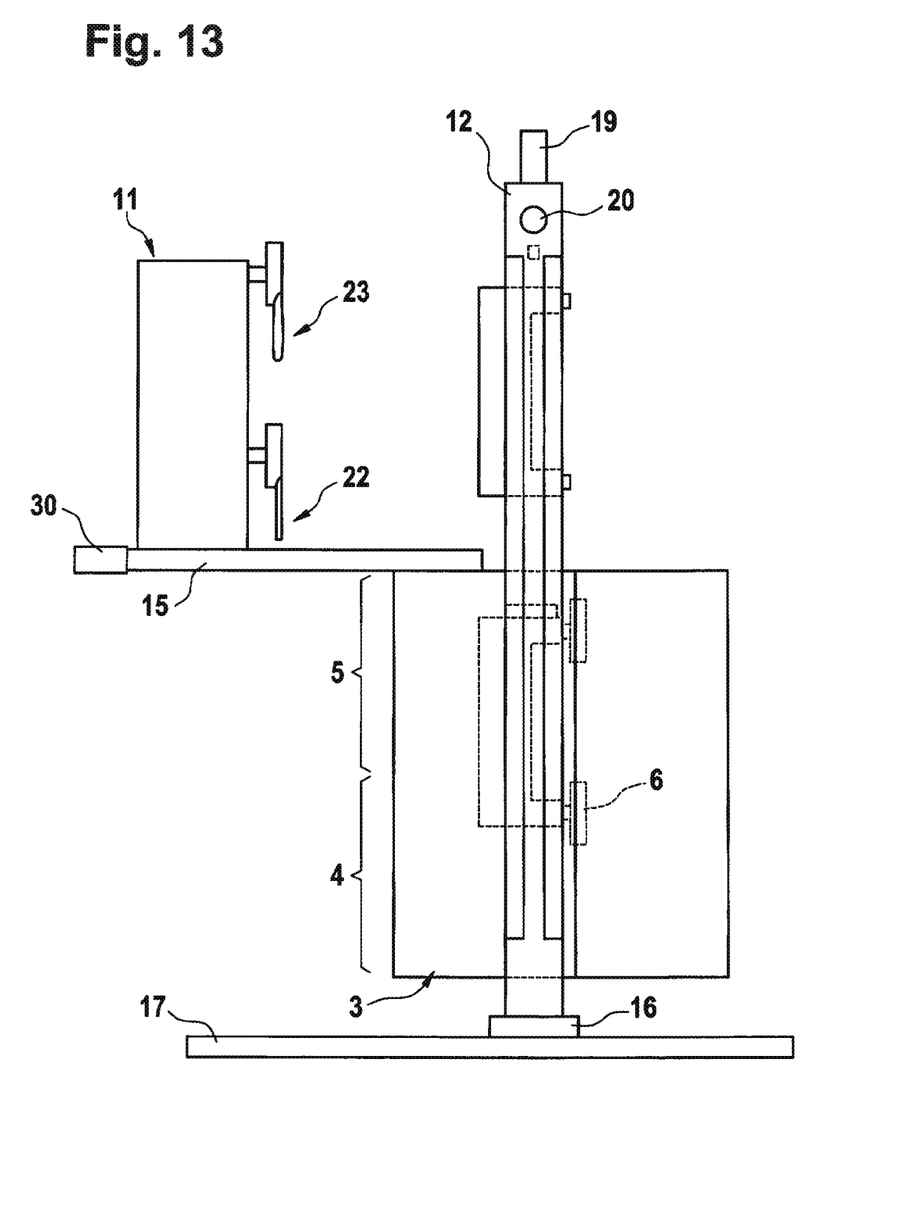
FIG. 13 A lateral view of the device according to the invention to explain a state in which the cooling station is moved back however still before a handling operation of the mold bars (mold bars) through a handling system which is not shown here in any detail, takes place.

Following the transfer, the cooling station 11 moves horizontally to the back (Path of 5) so that the state as shown in FIG. 13 is reached. After this, an exchange or repositioning of mold bars 6 through a handling device takes place in the cooling station. The sequence is as follows: the lower mold bar 6 with part bodies 22 is repositioned into the upper position; the upper mold bar 6 with finished toothbrush bodies 23 is removed and a mold bar 6 equipped with bristle bundles 27 is inserted in the lower position.

Figure 14:
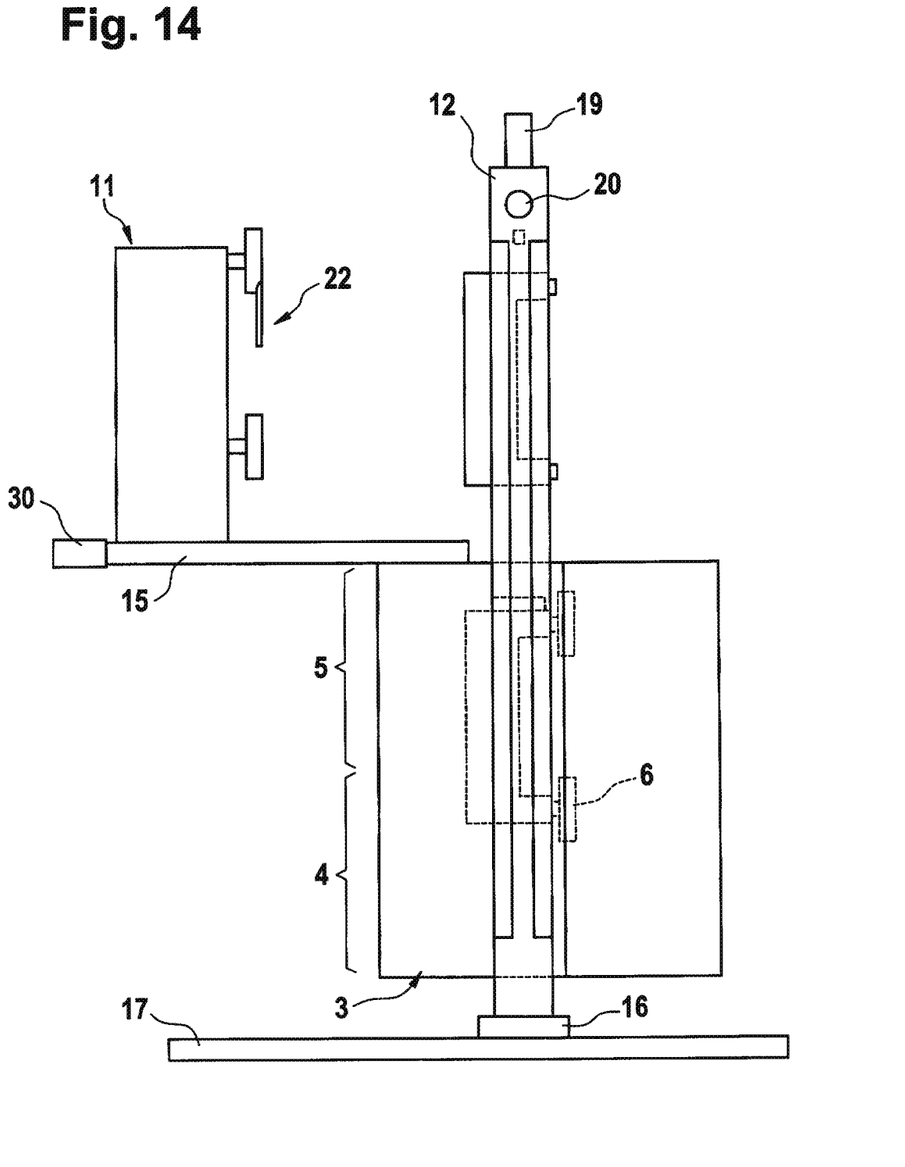
FIG. 14 A lateral view of the device according to the invention to explain a state in which the cooling station is moved back after the handling operation of the mold bars has taken place (removal of the finished workpieces, repositioning of the pre-molded parts to the top)
Figure 15:
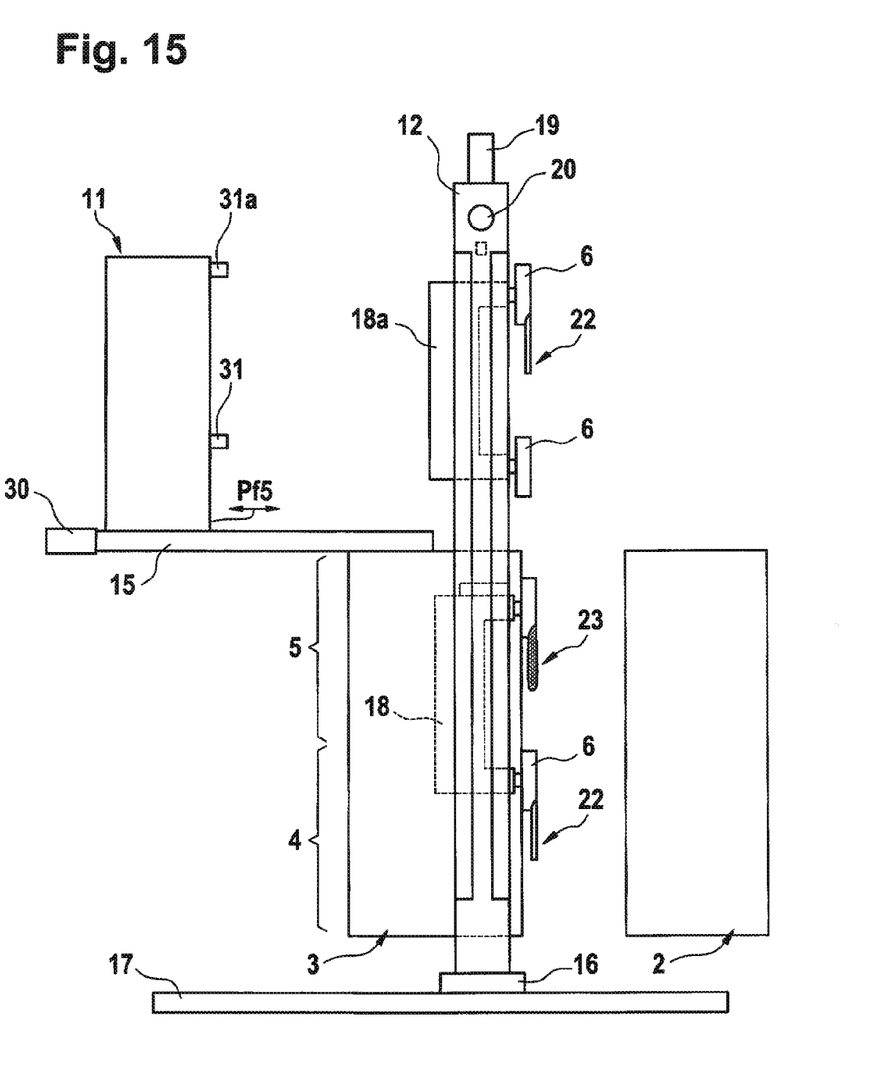
FIG. 15 A lateral view of the device according to the invention to explain a state in which the mold is opened. In the process, the in this representation mold half on the right jointly with the transfer system moves to the right, and FIG. 16 A lateral view of the device according to the invention to explain a state in which the suitably equipped receptacle/carrier of the cooling station is again moved towards the vertical transfer system.
Figure 16:
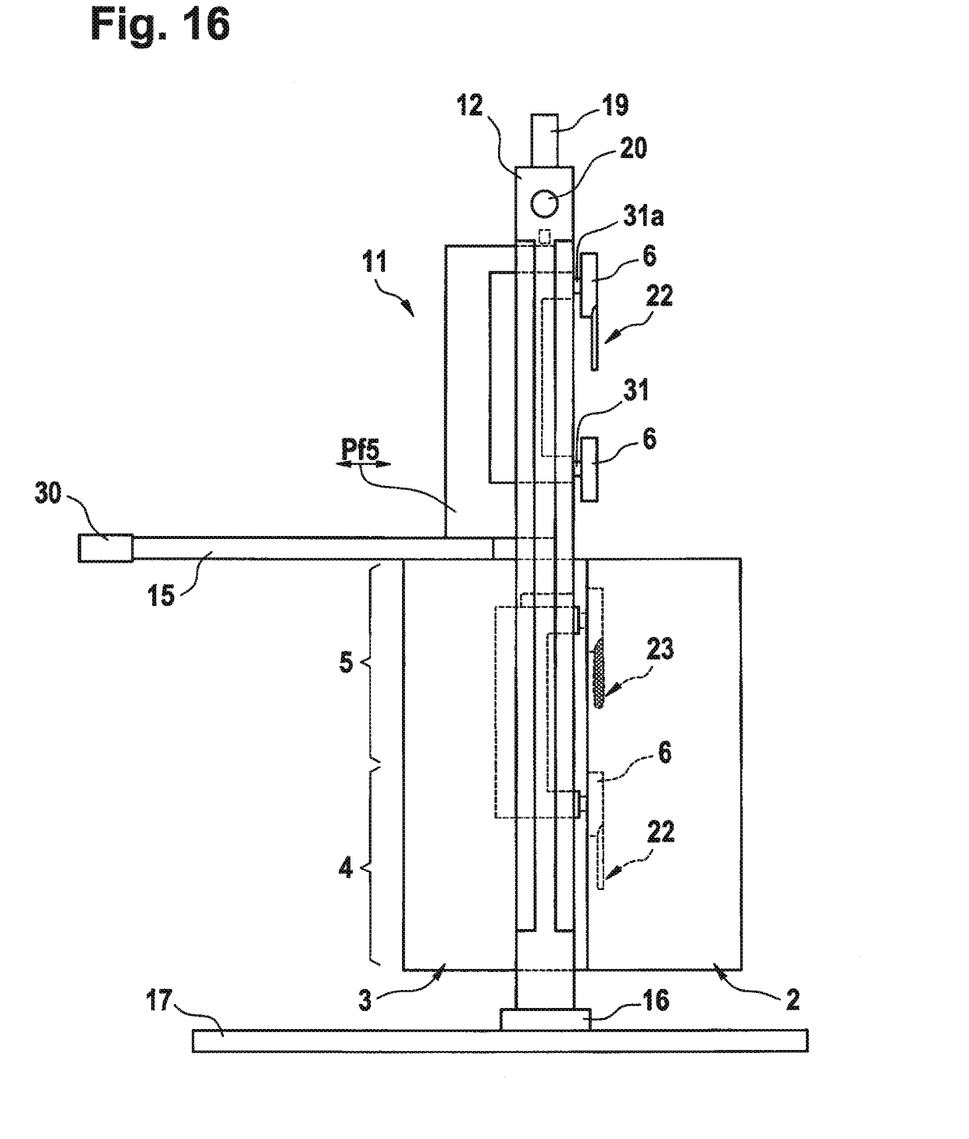

The situation following the mold bar transfer described above is illustrated in FIG. 14. Following the handling operation, the cooling station 11 again moves forward according to Path 5. The mold bars 6 are transferred from the receptacles (31 and 31a) of the cooling station 11 to the receptacle 18 or 18a. As already mentioned above, the part bodies 22 molded in the penultimate injection operation were able to cool down outside the injection mold during the complete injection cycle just occurring. The described cycle can be repeated again.

In one embodiment, the vertical transfer system 10 is tied to the moveable mold half on the ejector side and is moved and supported on linear guide carriages 16 on the guide rail 17 of the injection molding machine 1. In addition, the cooling station 11 with this exemplary embodiment is likewise connected with the movable mold half. During the opening and closing of the movable mold half the vertical transfer system 10 as well as the cooling station 11 thus move along in synchronization.

The vertical transfer system has a basic frame 12 on which all components of the vertical transfer system are mounted. The receptacles 18, 18a for the mold bars 6 are rigidly connected in vertical direction with the guide slides 26, 26a and movably mounted in horizontal direction (Path 3 and Path 4). For the vertical moving (Path 1 and Path 2) of the guide slides 26, 26a with the receptacles 18, 18a there are linear axes 13, 14 and 13a, 14a with the corresponding servo drives 20, 20a. For the horizontal swiveling in and swiveling out (Path 3 and Path 4) of the receptacles 18, 18a via the swivel arms 21, 21a there are swivel axes 25, 25a with the corresponding servo drives 19, 19a. The cooling station 11 is moved forwards and backwards (Path 5) via the linear axis 15 and with the corresponding servo drive 30. The receptacles 31 and 31a of the cooling station serve to receive the mold bars 6.

FIGS. 15, 7, 8, 10, 11, 12, 13, 14, 16 show the operation of the device according to one embodiment and the sequence of the manufacturing method according to one embodiment in the form of a sequence of figures.

In step 1 (FIG. 15) the mold 1 is opened. In the process, mold half 5b on the right jointly with the transfer system 10 moves to the right. At this stage, the pre-molded parts 22 just molded (lower injection station 4) and the in themselves finished plastic workpieces over-molded with a soft material component 29—in this case toothbrushes 23—are located in the mold 1. On the transfer slide 26 in this case located above the mold 1 is located a bristled mold bar 6 and a mold bar 6 provided with cooled-down pre-molded parts 22.

Figure 8:
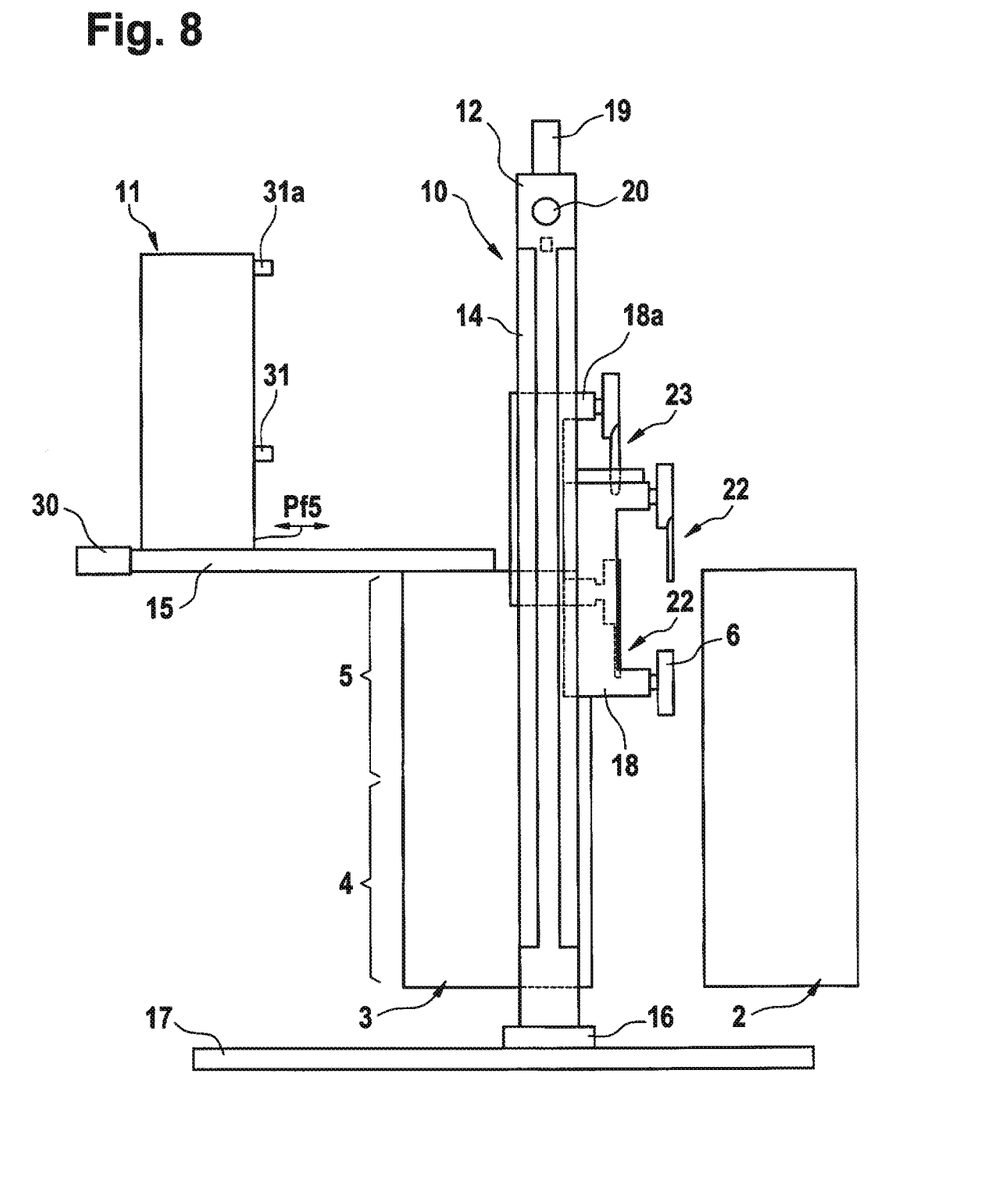
FIG. 8 A lateral view of the device according to the invention to illustrate the sequence of a position change of the slides.

In step 2 (FIG. 7) both carrying frames provided for handling the mold bars 6 are moved into a transfer position, which allows the vertical transfer of the carrying frames illustrated in the following in step 3 (FIG. 8). The mold bars 6 initially located in the mold 1 are now moved upwards; the mold bars 6 initially positioned outside the mold 1 are lowered.

In step 4 (FIG. 10), all mold bars 6 have reached their changing positions. In the mold 1 is now located at the level of the first injection station 4 the bristled mold bar 6 and at the level of the second injection station 5 the mold bar 6 equipped with cooled-down pre-molded parts 22. Outside the mold 1 are now located the intermediate molded parts (lower strip) just manufactured as well as the finish over-molded toothbrushes 23.

In step 5 (FIG. 11) the mold 1 is closed by moving against the right mold 1 half noticeable here. In step 6 (FIG. 12) the two mold bars 6 located outside the mold are suspended from the carrier of the cooling station 11. In step 7 (FIG. 13) the carrier of the cooling station 11 is moved back.

In step 8 (FIG. 14) the mold bar 6 provided with finished workpieces is removed through an external handling system. Furthermore, the mold bar 6 provided with pre-molded parts 22 is repositioned upwards and a bristled mold bar 6 inserted in the lower receptacle that is becoming vacant in the process. The carrying frames of the vertical transfer slide 26, 26a are repositioned into a receiving position.

In step 9 (FIG. 16) the suitably equipped receptacle/carrier 31, 31a of the cooling station 11 is again moved towards the vertical transfer system. In step 10 the carrying frames are lifted and in the process remove the mold bars 6 from the receptacle/carrier 31, 31a of the cooling station 11. Following minor backing up of the carrier of the cooling station 11 the manufacturing process can be continued by repeating the aforementioned sequence of steps.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A transfer system for manufacturing molded parts of plastic by means of a plastic injection device, the system comprising:
   a mold which can be opened via a mold separating surface;
   first and second injection stations formed in the mold; and
   a plurality of mold bars which are compatible with first and second injection stations;
   wherein pre-molded parts are manufactured in the first injection station and initially remain on the corresponding mold bar before being brought into the second injection station for molding a second workpiece section onto the pre-molded parts, and wherein the transfer system comprises a first transfer slide and a second transfer slide, the first transfer slide being structured to receive and move the pre-molded parts outside the first and second injection stations in a first linear direction, and the second transfer slide being structured to receive and move the pre-molded parts outside the first and second injection stations in a second linear direction opposite to the first linear direction, wherein the movement of the first transfer slide occurs simultaneously with the movement of the second transfer slide, so that the pre-molded parts disposed on said first and second transfer slides are cooled outside the first and second injection stations simultaneously with the first and second injection stations continuing operation.

2. The transfer system according to claim 1, wherein a mold bar loaded with pre-molded parts from the first injection station is brought into an intermediate region prior to moving to the second injection station.

3. The transfer system according to claim 2, wherein when the mold bar loaded with pre-molded parts in the first injection station is brought into the intermediate region, the molded parts manufactured in the second injection station are brought out of the second injection station.

4. The transfer system according to claim 2, wherein the mold bars following the opening of the mold are movable in vertical or horizontal direction to a vertical or horizontal level of the intermediate region.

* * * * *